United States Patent [19]
Woods et al.

[11] Patent Number: 4,964,037
[45] Date of Patent: Oct. 16, 1990

[54] MEMORY ADDRESSING ARRANGEMENT

[75] Inventors: William E. Woods, Natick; Richard A. Lemay, Carlisle; David A. Wallace, Chelmsford, all of Mass.

[73] Assignees: Bull HN Information Systems Inc.; Hutton/PRC Technology Partners 1, both of Billerica, Mass.

[21] Appl. No.: 19,898

[22] Filed: Feb. 27, 1987

[51] Int. Cl.⁵ .............................................. G06F 13/00
[52] U.S. Cl. .................................................. 364/200
[58] Field of Search .......................... 364/200; 367/78; 365/222

[56] References Cited
U.S. PATENT DOCUMENTS

| | | | |
|---|---|---|---|
| 4,366,539 | 12/1982 | Johnson et al. | 364/200 |
| 4,438,493 | 3/1984 | Cushing et al. | 364/200 |
| 4,559,620 | 12/1985 | Blair | 367/78 |
| 4,621,320 | 11/1986 | Holste et al. | 364/200 |
| 4,724,518 | 2/1988 | Steps | 364/200 |

Primary Examiner—Parshotam S. Lall
Assistant Examiner—V. Trans
Attorney, Agent, or Firm—Gary D. Clapp; John S. Solakian

[57] ABSTRACT

A memory address controller addresses two memories and selectively modifies an address before it is applied to the addressing input of one of the two memories. A bit of the address is used to indicate to the controller if the address is to be modified. The same address is applied unchanged to the addressing input of the other of the two memories by the memory address controller. In this manner the addressing range is expanded.

1 Claim, 3 Drawing Sheets

EVEN MEMORY 18A

| | |
|---|---|
| 00 | 01 |
| 04 | 05 |
| 08 | 09 |
| ∘ | ∘ |
| ∘ | ∘ |
| n | n+1 |
| n+4 | n+5 |
| n+8 | n+9 |

BYTE BYTE

ODD MEMORY 18B

| | |
|---|---|
| 02 | 03 |
| 06 | 07 |
| 10 | 11 |
| ∘ | ∘ |
| ∘ | ∘ |
| n+2 | n+2 |
| n+6 | n+7 |
| n+10 | n+11 |

BYTE BYTE

*FIG. 2*

READ OUT — MEMORY BYTES

| ADDRESS | EVEN MEMORY 18A | ODD MEMORY 18B |
|---|---|---|
| 0 | 00,01 | 02,03 |
| 1 | 00,01 | 02,03 |
| 2 | 04,05 | 02,03 |
| 3 | 04,05 | 02,03 |
| 4 | 04,05 | 06,07 |
| 5 | 04,05 | 06,07 |
| 6 | 08,09 | 06,07 |
| 7 | 08,09 | 06,07 |
| 8 | 08,09 | 10,11 |
| 9 | 08,09 | 10,11 |
| ∘ | ∘ | ∘ |
| N−3 | n,n+1 | n+2,n+3 |
| N−2 | n,n+1 | n+2,n+3 |
| N−1 | n+4,n+5 | n+2,n+3 |
| N | n+4,n+5 | n+2,n+3 |
| N+1 | n+4,n+5 | n+6,n+7 |
| N+2 | n+4,n+5 | n+6,n+7 |
| N+3 | n+8,n+9 | n+6,n+7 |
| N+4 | n+8,n+9 | n+6,n+7 |

*FIG. 3*

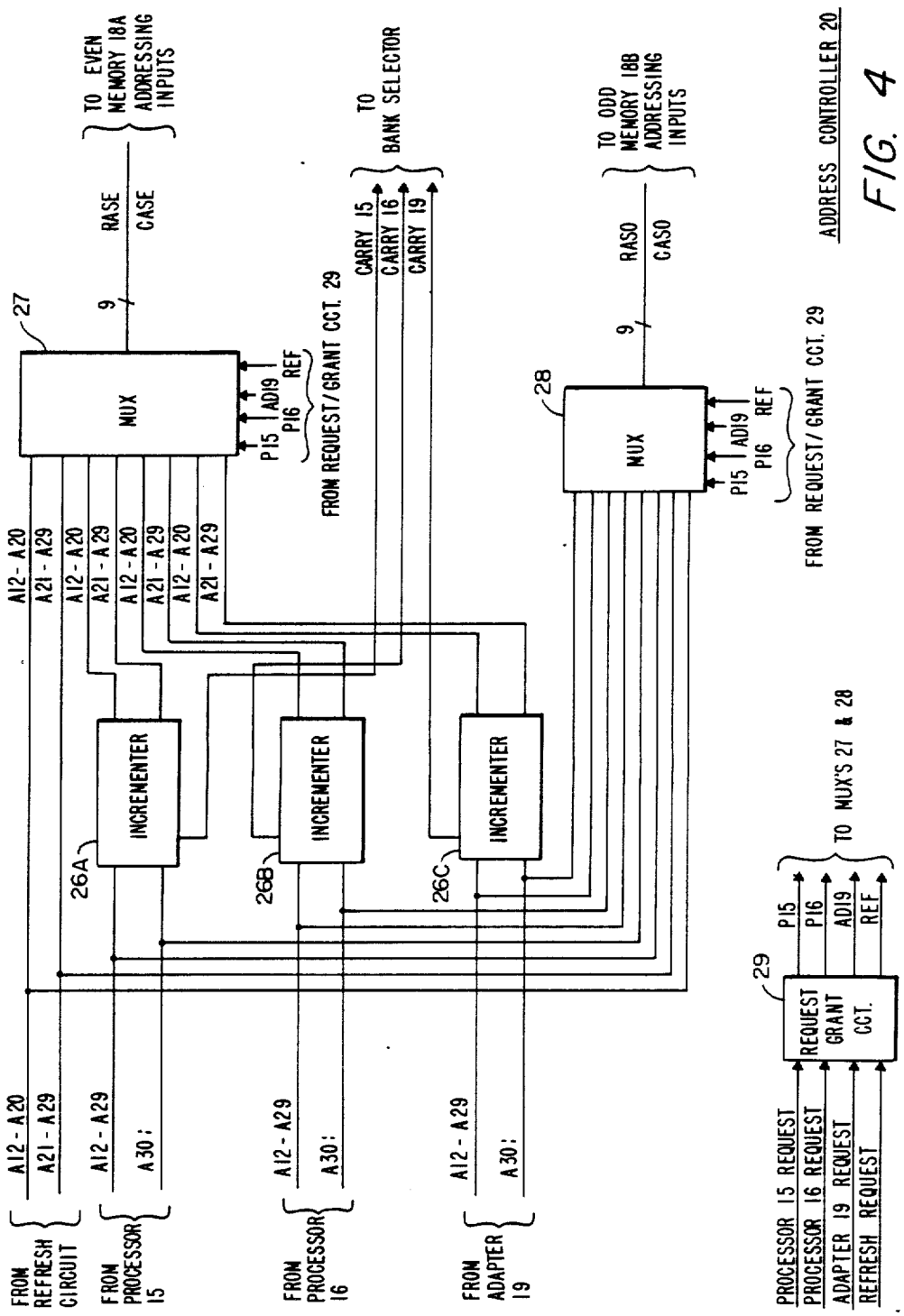

MEMORY ADDRESSING ARRANGEMENT

FIELD OF THE INVENTION

This invention relates to memories used in computers, and more particularly to the addressing of those memories.

BACKGROUND OF THE INVENTION

In the prior art many circuits and methods are taught for addressing memories in computer systems. Typically each discrete address applied to such a memory is used to read or write a discrete word or byte of a given number of bits from or into the memory. These memories are typically made up of a number of individual integrated circuit chip memories with each chip storing one bit of a stored byte; and all these chips have their address inputs wired in parallel so that the same location in each memory chip is read or written for any given address. As the bit size of bytes to be stored and read out increases, the number of chips wired in parallel increases correspondingly.

SUMMARY OF THE INVENTION

The above and other needs of the prior art are met by the subject memory address controller. A thirty-two bit byte memory made up of two sixteen-bit memories is provided and both sixteen bit memories are concurrently addressed in parallel during a read or write cycle. An input address is always applied to one of the two sixteen-bit memories, but the same address is also processed using a address controller and in some cases is incremented by one before being applied to the other of the two sixteen-bit memories. Thus, the same address location in each memory may or may not be accessed. In this manner thirty-two bit bytes are read out of the two memories and one or more eight-bit parts of each thirty-two bit byte are then selected for use by a processor that writes and reads the memory.

DESCRIPTION OF THE DRAWING

The invention will be better understood upon reading the following detailed description is conjunction with the drawing in which;

FIG. 2 is a table showing the byte make up of each thirty-two bit byte read from two memories;

FIG. 3 is a table showing samples of the eight-bit bytes making up thirty-bit bytes that are read from the memories for addresses input to an address controller; and FIG. 4 is a detailed block diagram schematic of an address controller and a request grant circuit controlling access to the address controller.

DETAILED DESCRIPTION

Figure 1:
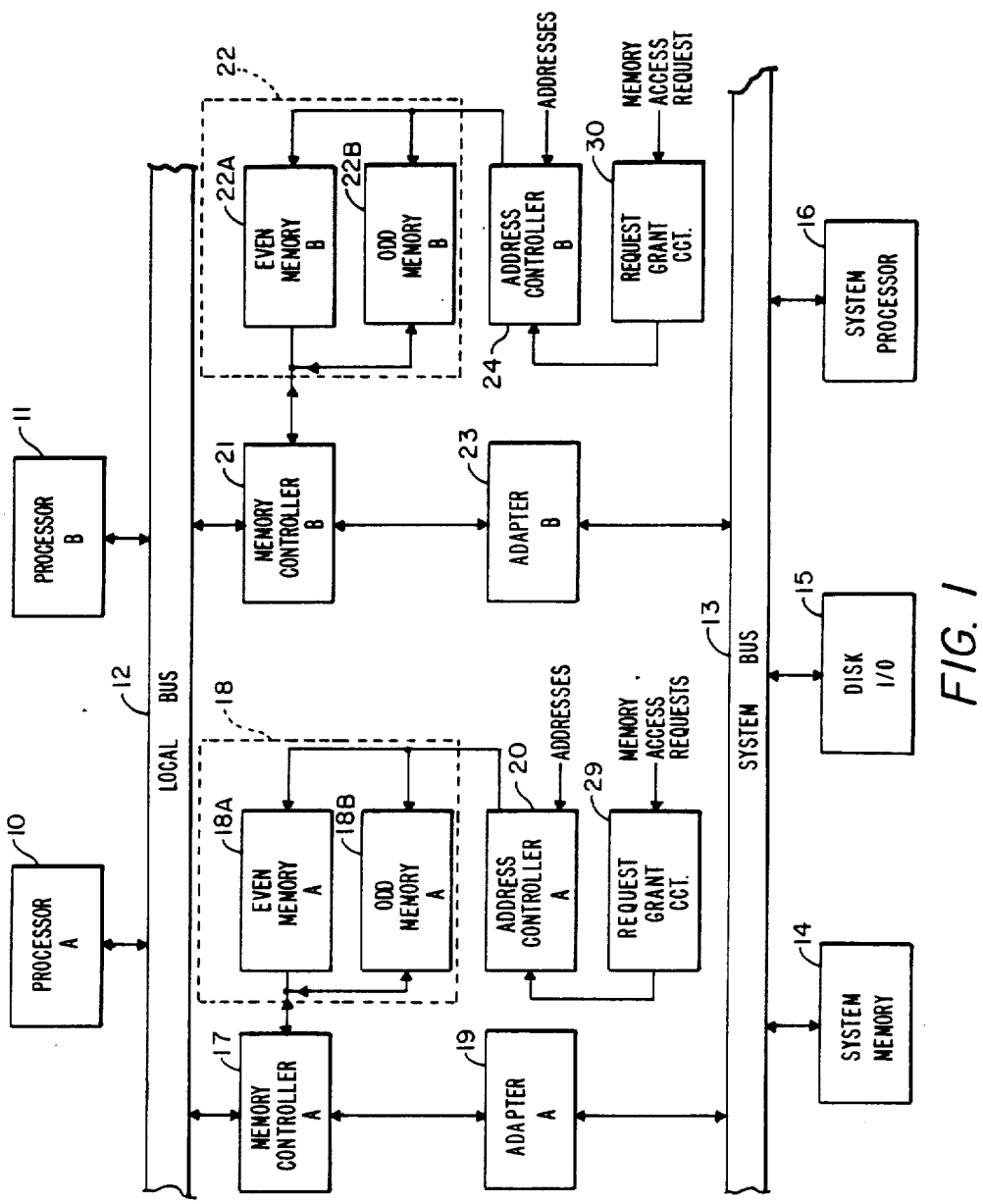
FIG. 1 is a block diagram of a portion of a computer system having memory and address controllers in accordance with the teaching of the invention.

In FIG. 1 is shown a block diagram of a portion of a computer system with shared memories in which memory controllers and address controllers are utilized. Standard computer system elements are processor 10, processor 11, system bus 13, system memory 14, disk input/output device 15 and system processor 16. In the prior art processors 10 and 11 would be called co-processors and would normally be connected to system bus 13 along with memories 18 and 22 and system processor 16. Processors 10, 11, and 16 would cooperate in a multiprocessing arrangement with system processor 16 being a master or control processor, in a well known manner. However, in the present embodiment processors 10 and 11 are connected to a local bus 12 and are the primary users of memories 18 and 22 which are not provided for general access to other circuits connected to system bus 13.

The two memories 18 and 22 are each made up of an even memory and an odd memory and are primarily for the shared use of program processors 10 and 11. This shared access increases the efficiency of use of processors 10 and 11, and of memories 18 and 22. Memories 18 and 22 are respectively associated with a memory controller 17 and a memory controller 21 which control the shared access to these memories. Memory controllers 17 and 21 are connected to local bus 12 but can be connected to system bus 13 via adapters 19 and 23 respectively. Memory controllers 17 and 21 primarily control shared access to their respective memories 18 and 22 by either processor 10 or processor 11. In this manner the chances of either processors 10 or 11 having to wait to gain access to memory are decreased.

Memories 18 and 22 may also be accessed by system processor 16 via system bus 13 and adapters 19 and 23 respectively to load programs and data to be processed into these memories for subsequent processing by processors 10 and 11. Similarly, memories 18 and 22 may be read out by system processor 16 to other storage circuits connected to system bus 13. In addition, processors 10 and 11 each have access via memory controllers 17 and 21 and adapter circuits 19 and 23 respectively connected thereto to system bus 13 to gain access to other storage circuits thereon such as system memory 14 and disk I/O 15.

In accordance with the teaching of the present invention an address controller 20 controls addressing of even memory 18A and odd memory 18B, and another address controller 24 controls addressing of even memory 22A and odd memory 22B. The circuit details of an exemplary address controller 20 are shown in FIG. 4 which is described further in this specification. A request grant circuit 29 controls access to address controller 20 by processors 10 and 11, adapter 19 and a memory refresh circuit (not shown). Memory refresh circuits are well known in the art so one is not disclosed herein. Address controller 24 is identical to address controller 20 so only controller 20 is described hereinafter to avoid duplication.

In FIG. 2 is shown a pictoral representation of one of memories 18 and 22. Only memory 18 is represented in FIG. 2 and is described hereinafter, but the same description applies to memory 22. Accordingly, the description is not repeated with regards to memory 22 for the sake of brevity Memory 18 has an even memory portion 18A and an odd memory portion 18B. Memory 18A is represented as a block with two columns, each column representing a number of eight-bit bytes. Odd memory 18B is also represented as a block with two columns, each column also representing a number of eight-bit bytes A row in each memory box has two numbers therein, and each number represents an eight-bit byte, and when memories 18A and 18B are jointly read out, a sixteen-bit byte is read out of each memory to make up the thirty-two bit byte.

In the prior art, with two memories such as memories 18A and 18B connected in parallel, an address applied to their addressing input accesses a single row in FIG. 2 to read or write four eight-bit bytes such as 04, 05, 06 and 07. This is not necessarily the case when addressing memories 18A and 18B in accordance with the teaching of the present invention. An address generated for concurrently accessing even memory 18A and odd memory 18B is applied unchanged to the addressing input of odd memory 18B to write or read that memory. However, the same generated address is not always applied unchanged to the addressing input of even memory 18A. Instead, the generated address is analyzed by address controller 20 before being applied to even memory 18A. In some instances the original generated address is applied unchanged to the addressing input of even memory 18A, and in other instances the generated address is incremented before being applied to the addressing input.

Thus, even memory 18A and odd memory 18B may or may not actually be addressed by the same address and, read out the same row of bytes in FIG. 2 For example, with reference to FIG. 2, in some instances address controller 20 will cause bytes 04 and 05 to be read out of even memory 18A while bytes 02 and 03 are read out of odd memory 18B. These two sets of bytes are not in the same address location in memories 18A and 18B. However, in another instances bytes 04 and 05 are read out of even memory 18A while bytes 06 and 07 are read out of odd memory 18B. These latter two sets of bytes are in the same address location in memories 18A and 18B. This operation is described in greater detail further in this specification.

In FIG. 3 is shown a table indicating which pair of eight-bit bytes in even memory 18A and in odd memory 18B are actually to be read out responsive to a memory address generated for read out of the two memories. For address "zero" eight-bit bytes 00 and 01 in even memory 18A are addressed, and eight-bit bytes 02–03 in odd memory 18B are addressed. These two sets of bytes are in the same memory location in memories 18A and 18B as may be seen in FIG. 2. The generated "zero" address is applied unchanged to the addressing inputs of memories 18A and 18B to access these bytes. Note in FIG. 3 that the generated address "one" accesses the same four eight-bit bytes 00–03.

In FIG. 3, generated address "two" reads out bytes 04–05 from even memory 18A and bytes 02–03 from odd memory 18B. Per FIG. 2 bytes 02–03 are at one address location in odd memory 18B and bytes 04–05 are at a different memory location in even memory 18A. Thus, the addresses to be actually applied to even memory 18A and to odd memory 18B are different for generated address "two". The actual address applied to odd memory 18B remains the same to access bytes 02–03, but the address actually applied to even memory 18A is incremented by one to access bytes 04–05. This incrementation is done by address controller 20. Note in FIG. 3 that the two different addresses actually applied to memories 18A and 18B are the same for generated addresses "two" and "three" because the same eight-bit bytes 02–05 are addressed.

Similarly, when memories 18A and 18B are addressed responsive to generated address "four" and "five" the same generated address is used to address both even memory 18A and odd memory 18B and bytes 04 through 07 are accessed as seen in FIG. 2.

However, when generated addresses "six" and "seven" are applied to address controller 20, per FIG. 3 the same address locations in even memory 18A and odd memory 18B are not addressed. The same generated memory address is not used to address both even memory 18A and odd memory 18B. This is obvious because bytes 06–07 in odd memory 18B are in a different row from bytes 08–09 in even memory 18A in FIG. 2. Address controller 20 has incremented the generated address and then applied it to the addressing inputs of even memory 18A.

Thus, when reviewing FIGS. 2 and 3 and the last few paragraphs, it can be seen that when addressing memory locations 0–1, 4–5, 8–9, N+1–N+2, etcetera, the generated address is applied to both even memory 18A and odd memory 18B. However, when addressing memory location 2–4, 7–8, n–1–n, etcetera the actual memory address for odd memory 18B is the generated address, but the actual memory address for even memory 18A is the generated address incremented by one and then used to address even memory 18A.

To state it another way, and referring to FIG. 3, for generated addresses "zero" and "one" the generated address is applied to even memory 18A to access bytes 00–01 and to odd memory 18B to access bytes 02–03. However, for generated addresses "two" and "three" the previous generated address is applied to odd memory 18B to access bytes 02–03, but is incremented by one and used to address even memory 18A to access bytes 04–05.

To implement the address incrementation described in the previous paragraphs the address controller 20 shown in FIG. 4 is used. There is one controller 20 for memory 18 and it has a address input from each circuit that can address the memory. Although not described further, there is one address controller 24 for memory 22. The address inputs to controller 20 are address bits A12 through A30, and bit A30 is examined to determine if the address represented by the other bits A12 through A29 should be incremented before being applied to the addressing inputs of the even portion 18A of memory 18. The same address bits A12 through A29, unincremented, are applied to the addressing inputs of an odd portion 18B of memory 18. Each input address has thirty-two bits (0–31) with bit thirty-one being the lowest order bit. Accordingly, the thirtieth bit changes between zero and one for every other address. Because the address bits represent the byte address of a memory location, address bits 30 and 31 represent the double-byte (word and byte offset respectively) of the thirty-two bit memory data. Since the memory controller is designed to provide thirty-two bits whenever a memory read operation is performed, bit 30 is critical to determining whether the thirty-two bits provided are even-and-odd from the same memory data, or odd-and-even from two consecutive thirty-two bit memory data. When address bit 30 is a one, the address presented to the even word portion of the thirty-two bit memory data must be incremented in order to achieve the odd-and-even requirement. When address bit thirty is a one, an incrementer 26 in address controller 20 responds to increment bits A12 through A29 of the addresses input to it from each circuit requesting access to the memory and applies the incremented address via its output to a multiplexer (MUX) 27. When bit thirty is a zero, incrementer 26 in address controller 20 does not increment the address bits at its inputs before applying ones of the addresses to multiplexer (MUX) 27 to be selectively applied to the addressing inputs of even memory 18A. The same input addresses are always applied unchanged to multiplexer (MUX) 28 to be selectively applied to the addressing inputs of odd memory 18B.

Thus, for example, when an address input to one of the three selectors 26 in address controller 20 is address "three" in FIG. 3, bit thirty in the address is a one. Address controller 20 responds to bit thirty being a one to increment the generated address by one and applies the incremented address via MUX 27 to the addressing inputs of even memory 18A while the unincremented address is applied to the addresssing inputs of odd memory 18B For input address "five" in FIG. 3, bit thirty of the address is a zero and incrementer 26 in address controller 20 does not increment the input address. After being selected by MUXs 27 and 28 the address is applied unchanged to the addressing inputs of both even memory 18A and odd memory 18B. If incrementation of an address results in a carry, there is a carry output from the appropriate one of selectors 26A, 26B, or 26C to be used by a bank selector also used in addressing memories 18A and 18B.

Address controller 20 services memory access requests from processors 15 and 16, adapter 19 and a memory refresh circuit (not shown) that can address memory 18 that is made up of memories segments 18A and 18B so that addresses from these requesting circuits may be pre-incremented before ones of the addresses are applied to the memory segments. Pre-incrementation of addresses minimizes the time required to address memory 18A after a requesting circuit is granted access to memory 18. The address leads A12 through A30 from processor 15 are input to both incrementer 26A and multiplexer (MUX) 28. The address leads A12 through A30 from processor 16 are input to both incrementer 26B and MUX 28. The address leads A12 through A30 from adapter 19 are input to both incrementer 26C and MUX 28. Address leads A12 through A29 from the memory refresh circuit are input directly to both MUXs 27 and 28. There is no lead A30 from the refresh circuit since the refresh address will never be incremented. Since memory refresh circuits and their operation are well known in the art one is not disclosed herein to avoid detracting from the description of the invention.

Incrementer logic 26 preferably comprises a programmable arithmetic logic (PAL) circuit designated 22V10 and available from Advanced Micro Devices and other suppliers of integrated circuits. To program the PAL to respond to address bit thirty being a one to increment the address, an Abel PAL Compiler manufactured by Data I/O of Redmond, Washington is used. The PAL is programmed with the mathematical expression address_ out=address_ in &! ad_ 30 # (address_ in+1) & ad_ 30;. In operation, bits A12-A30 of each address are input to the programmed PAL of incrementer logic 26 and it responds to bit thirty being a one to provide an output which is the input address bits on leads A12-A29 incremented by one.

Multiplexers 27 and 28 are respectively used to apply ones of the addresses input to address controller 20 to even memory 18A and to odd memory 18B respectively. Multiplexers 27 and 28 are each implemented with a 4:1 multiplexer integrated circuit designated 744AS257 available from Texas Intruments and other device manufacturers. Memories 18A and 18B are large capacity dynamic random access memories (DRAM) that are addressed using row address strobe (RAS) and column address strobe (CAS) signals in a manner well known in the art. This two part address scheme of RAS and CAS signals, each nine bits in length, are sequentially output from multiplexers 27 and 28 responsive to a timing signal input thereto. The timing signal first causes bits A21-A29 to be selected and output from multiplexers 27 and 29 as the RAS signal, and then causes bits A12-A20 to be selected and output from the multiplexers as the CAS signal As shown in FIG. 4 multiplexer 27 provides RASO and CASO addressing signals to odd memory 18B, and multiplexer 28 provides RASE and CASE addressing signals to even memory 18B. Responsive to the RAS and CAS signals memories 18A and 18B are addressed in a manner well known in the art so is not described herein for the sake of brevity.

Since there are four circuits vying for addressing access to memories 18A and 18B, multiplexers 27 and 28 are utilized to connect the address from only one of the vying circuits (processors 15 and 16, adapter 19 and memory refresh) to memories 18A and 18B at a time. To connect only one address at a time to the memory, multiplexers 27 and 28 are controlled by a request grant circuit 29 which is also shown in FIG. 4. Request grant circuits are well known in the art and one is taught in U.S. Pat. No. 4,493,036 having the same assignee as the present invention. There are four request inputs to request grant circuit 29. They are a request from processor 15, a request from processor 16, a request form adapter circuit 19, and a request from the memory refresh circuit (not shown). Memories 18A and 18B are NMOS memory, well known in the art, and in operation charge slowly leaks off and must be refreshed or the contents of memory are lost Since it cannot be permitted to lose the contents of memory, its contents are periodically refreshed and a refresh request must have the highest priority In operation of request grant circuit 29, when address controller 20 is idle the first of the four requests to appear at the inputs of circuit 29 is immediately granted. However, if two requests from a first and a second circuit asppear simultaneously, the request from the circuit having the higher priority is first granted access through multiplexers 27 and 28 to memories 18A and 18B. When the first circuit to which access to the memory has been granted is finished with a read or write operation, the access request from the second circuit is granted. If while the first circuit has addressing access via multiplexers 27 and 28 to memories 18A and 18B a third circuit requests access to these memories, request grant circuit 29 will then select between the second and third circuits requesting access and the one of these two circuits having the higher priority will be granted access via multiplexer 27 and 28 to memories 18A and 18B following the first circuit.

There is also an End of Cycle input to request grant circuit 29 which has a signal thereon from a system clock or timing circuit, not shown but well known in the art, which indicates the start of another machine cycle. This timing signal restarts circuit 29 to make another decision and grant access in address controller 20.

Whichever access requesting circuit is granted access to the memory by request grant circuit 29, it will have its associated request granted output lead (P15, P16, AD19, or REF) go high. For example, if processor 15 requests connection to memories 18A and 18B and the request is granted by circuit 29, output lead P15 goes high. Output lead P15 is a control input to both MUXs 27 and 28 and causes them to connect the incremented-/unincremented addresses from processor 15 to the addressing inputs of memories 18A and 18B. Although not shown in FIG. 3, the request grant outputs from request grant circuit 29 are also connected to their respective access requesting circuits so that the requesting circuits receive an indication when their request is granted and they are connected to memories 18A and 18B.

While what has been described hereinabove is the referred embodiment of the invention, it will be obvious to those skilled in the art that numerous changes may be made without departing from the spirit and scope of the invention. For example, bits of the addresses input to the address controller can also decrement or otherwise alter the input addresses, and an address controller may be used with each smaller memory making up a larger composite memory.

What is claimed is:

1. An memory for use in an electronic data processing system which comprises, in combination, first and second random access memories each having an address input and a data port, each of said memories being capable of storing fixed length units of binary data at addressable storage locations specified by addresses applied to said address input, means for writing data into said first and second memories comprising a source of a sequence of units of data and a source of a sequence of address values corresponding to said units, and means for writing units associated with even-numbered addresses into said first memory and for writing units associated with odd-numbered addresses into said second memory, and means for reading units of data from said memory comprising, in combination, a source of address values, and means for concurrently applying first and second addresses to the address inputs of said first and second memories to permit units of data to be read concurrently from said first and second memories, said first and said second addresses being derived from the high-order bits of each given address value from said source such that, when said given address is even-numbered said first and second addresses are equal in value and, when said given address value is odd-numbered said first address is incremented by one, thereby insuring that the unit specified by said given address and the unit specified by said given address plus one are always read concurrently from said first and second memories;

wherein each of said fixed length units of data comprises a pair of eight-bit bytes, and wherein the least significant bit value of each of said address values specifies the particular eight-bit byte within a particular unit and the next-to-least significant digit specifies whether the unit address is odd or even, and the remainder of said address value is used to generate said first and second addresses.

* * * * *